(12) United States Patent
Bosze et al.

(10) Patent No.: US 11,745,624 B2
(45) Date of Patent: Sep. 5, 2023

(54) MESSENGER WIRES FOR ELECTRIC TRAINS, METHODS FOR MAKING AND METHODS FOR INSTALLATION

(71) Applicants: CTC Global Corporation, Irvine, CA (US); Lamifil nv, Hemiksem (BE)

(72) Inventors: Eric Bosze, San Diego, CA (US); Peter Hermans, Mechelen (BE)

(73) Assignees: CTC Global Corporation, Irvine, CA (US); Lamifil NV, Hemiksem (BE)

( * ) Notice: Subject to any disclaimer, the term of this patent is extended or adjusted under 35 U.S.C. 154(b) by 359 days.

(21) Appl. No.: 16/060,327

(22) PCT Filed: Dec. 12, 2016

(86) PCT No.: PCT/US2016/066152
§ 371 (c)(1),
(2) Date: Jun. 7, 2018

(87) PCT Pub. No.: WO2017/100762
PCT Pub. Date: Jun. 15, 2017

(65) Prior Publication Data
US 2018/0361879 A1 Dec. 20, 2018

Related U.S. Application Data

(60) Provisional application No. 62/266,360, filed on Dec. 11, 2015.

(51) Int. Cl.
*B60M 1/22* (2006.01)
*H01B 5/10* (2006.01)
(Continued)

(52) U.S. Cl.
CPC .............. *B60M 1/22* (2013.01); *H01B 1/026* (2013.01); *H01B 5/105* (2013.01); *H01B 9/008* (2013.01)

(58) Field of Classification Search
CPC ........ H01B 5/105; H01B 9/008; H01B 5/101; H01B 5/102; H01B 5/104; B60M 1/22
(Continued)

(56) References Cited

U.S. PATENT DOCUMENTS 2,138,420 A    11/1938  Glasser et al.
3,378,631 A *  4/1968  Edwards ................ H01B 5/101
                                                 174/130
(Continued)

FOREIGN PATENT DOCUMENTS

EP    0345567 A1    12/1989
EP    2639797 A1    9/2013
(Continued)

OTHER PUBLICATIONS

International Search Report and Written Opinion dated Mar. 22, 2017 for International Patent Application No. PCT/US2016/0066152.
(Continued)

*Primary Examiner* — Zachary L Kuhfuss
(74) *Attorney, Agent, or Firm* — David F. Dockery; The Navitas Intellectual Property Group LLC (57) ABSTRACT

An electrical train messenger wire and a catenary system for an electrical train including the electrical train messenger wire. The messenger wire includes a fiber-reinforced composite strength member and a conductive layer surrounding the fiber-reinforced composite strength member, where the conductive layer is fabricated from copper or a copper alloy. The fiber-reinforced strength member advantageously has a high tensile strength, thereby reducing the sag of a contact wire supported by the messenger wire. The catenary system employing the messenger wire may facilitate faster train (Continued)

speeds and may obviate the need for cantilever systems such as balanced weight anchors to maintain tension in the contact wire.

31 Claims, 7 Drawing Sheets

(51) Int. Cl.
  *H01B 1/02* (2006.01)
  *H01B 9/00* (2006.01)
(58) Field of Classification Search
  USPC .................................................. 191/40, 41
  See application file for complete search history.

(56) References Cited

U.S. PATENT DOCUMENTS

| | | | | |
|---|---|---|---|---|
| 3,445,586 A * | 5/1969 | Mussen | ................ | H01B 5/00 174/130 |
| 3,619,480 A * | 11/1971 | Baker | ................ | H01B 5/10 174/130 |
| 3,813,772 A * | 6/1974 | Adams | ................ | H01B 13/0235 29/872 |
| 3,829,630 A * | 8/1974 | Belyaev | ................ | B60M 1/23 191/41 |
| 4,673,775 A * | 6/1987 | Nigol | ................ | H01B 5/104 174/128.1 |
| 7,179,522 B2 | 2/2007 | Hiel et al. | | |
| 7,549,521 B2 | 6/2009 | Aisenbrey | | |
| 2005/0279527 A1 | 12/2005 | Johnson | | |
| 2006/0071862 A1 | 4/2006 | Aisenbrey | | |
| 2007/0193767 A1 * | 8/2007 | Guery | ................ | H01B 5/105 174/106 R |
| 2009/0114419 A1 * | 5/2009 | Park | ................ | H01B 5/10 174/113 R |
| 2015/0027773 A1 | 1/2015 | Guery et al. | | |

FOREIGN PATENT DOCUMENTS

| | | |
|---|---|---|
| JP | 2007-191032 A | 8/2007 |
| RU | 2417468 C1 | 4/2011 |

OTHER PUBLICATIONS

First Office Action dated May 17, 2019 for Chinese Patent Appl. No. 201680081552.7.
Office Action dated Apr. 17, 2020 for European Patent Application No. 16820477.4.
Office Action dated Apr. 2, 2020 for Russian Patent Application No. 2018125253.
Office Action dated Jul. 24, 2020 for Indian Patent Application No. 201817025079.
Office Action dated Nov. 20, 2020 for Indonesian Patent Application No. P00201805027.
Office Action dated Oct. 9, 2020 for Australian Patent Application No. 2016366774.
Office Action dated Sep. 27, 2020 for Chinese Patent Application No. 201680081552.7.
Reexamination Office Action dated Apr. 2, 2021 for Chinese Patent Application No. 201680081552.7.
Office Action dated Oct. 17, 2022 for Canadian Patent Application No. 3,008,008.

* cited by examiner

MESSENGER WIRES FOR ELECTRIC TRAINS, METHODS FOR MAKING AND METHODS FOR INSTALLATION

This application is a 35 U.S.C. 371 U.S national stage application of International Patent Application No. PCT/US2016/066152 filed Dec. 12, 2016, which claims the priority benefit of U.S. Provisional Patent Application No. 62/266,360 filed on Dec. 11, 2015, which is incorporated herein by reference in its entirety.

FIELD

The present disclosure relates to the field of electric train systems and components for electric train systems including messenger wires.

BACKGROUND

Messenger wires are used in electrified train systems to support the contact wire that the train contacts through a pantograph as the train moves. A typical messenger wire includes a plurality of conductive copper or copper alloy wires stranded around a strength member comprised of copper-cladded steel. During use, an electrical current is passed through the messenger wire (i.e., through the copper wires) and is transmitted from the messenger wire to the contact wire. As a result, the messenger wire heats up due to resistance heating of the copper. On hotter days, the ambient temperature and solar radiation can also contribute to heating of the messenger wire by limiting the ability of the messenger wire to dissipate the heat. These factors contribute to the thermal expansion of the messenger wire, resulting in downward sagging of the messenger wire, which also changes the elevation of the contact wire above the train tracks. This in turn affects how well the pantograph stays in contact with contact wire as the train moves, and affects the maximum safe speed of the trains.

SUMMARY

The present disclosure relates to improvements in the messenger wire structure. In one aspect, a fiber-reinforced composite material having a low coefficient of thermal expansion is used as the strength member to support the conductive wires, the conductive wires comprising copper or a copper alloy. In another aspect, a space (i.e., a gap) is formed between a conductive layer and the strength member, the conductive layer comprising wires (e.g., strands) of copper or a copper alloy. As a result, substantially all of the tension (e.g., tensile stress) may be placed on the strength member when the messenger wire is installed, leaving little or no tension on the conductive layer. In another aspect, a conductive layer comprises helically wound conductive wire strands (e.g., copper wire strands) that are disposed about the circumference of the strength member.

In one embodiment, the present disclosure is directed to an electrical train messenger wire. The electrical train messenger wire may comprise a fiber-reinforced composite strength member and a conductive layer surrounding the fiber-reinforced composite strength member, e.g., that is physically supported by the fiber-reinforced composite strength member during use. The conductive layer comprises copper or a copper alloy. The electrical train messenger wire may comprise a gap between the composite strength member and the conductive layer. The conductive layer may comprise a plurality of helically-wound conductor strands. For example, the conductive layer may comprises a plurality of copper conductor strands. The fiber-reinforced composite strength member may comprise high tensile modulus reinforcing fibers, such as high tensile modulus reinforcing carbon fibers.

The electrical train messenger wire may also comprise an insulative layer (e.g., an electrically insulative layer) disposed between the fiber-reinforced composite strength member and the conductive layer. An electrically insulative layer may advantageously prevent or substantially reduce electrochemical reactions (e.g., galvanic corrosion reactions) between the strength member and the surrounding layer comprising copper or a copper alloy. In one embodiment, the insulative layer comprises substantially continuous glass fibers that are integrally formed with the strength member. In another embodiment, the insulative layer comprises a polymeric coating over the strength member.

In one characterization, the fiber-reinforced composite strength member has a coefficient of thermal expansion (CTE) that is not greater than about $2 \times 10^{-6}/°$ C. (about $1.11 \times 10^{-6}/°$ F.). In another characterization, the tensile strength of the fiber-reinforced composite strength member is at least about 2100 MPa (about 305 ksi). In another characterization, the tensile modulus of the fiber-reinforced composite strength member is at least about 110 GPa (about 15.9 Msi).

DESCRIPTION

The present disclosure relates to catenary systems for electric trains, and particularly to messenger wires useful in such catenary systems. The present disclosure also relates to methods for making the messenger wires and methods for installation of the messenger wires.

For convenience, the term "train" and its inflected forms are used throughout this description to refer to the vehicles that are propelled by the application of electricity from overhead electrical wires. However, the term train and its inflected forms are used herein as generic terms to encompass all manners of trains (including passenger trains and cargo trains), trams, trolley busses, tire metros and other vehicles that are electrified, i.e., are powered by the application of electricity through an overhead electrical system.

Figure 1:
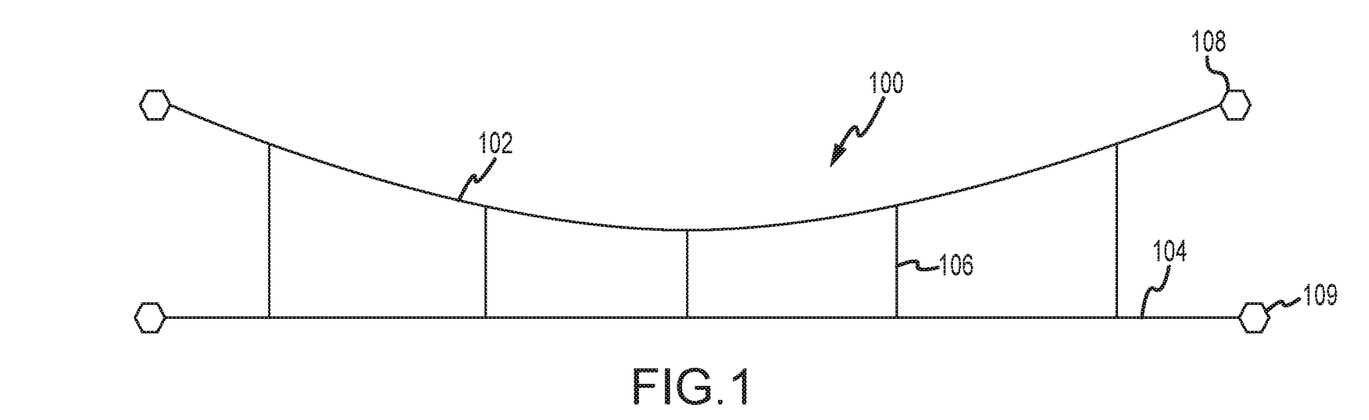
FIG. 1 schematically illustrates a side view of a simple catenary system for an electrified train.

FIG. 1 schematically illustrates a side view of a simple catenary system 100 for an electrified train. The train (not illustrated) is powered through the application electricity and moves along rails that are affixed to the ground below the catenary system 100. Electricity is provided to the train by a contact wire 104 which contacts the train through a pantograph as the train travels along the length of the contact wire 104. The contact wire 104 is supported along its length in a generally horizontal orientation by a messenger wire 102 (also referred to as a catenary wire) that is disposed above the contact wire 104 and is connected to the contact wire 104 by a plurality of droppers 106 (also referred to as hanger cables). The droppers 106 connect the messenger wire 102 to the contact wire 104 both mechanically, to physically support the contact wire 104, and electrically, to provide electrical current to the contact wire 102 through the droppers 106. Thus, each of the messenger wire 102, the droppers 106 and the contact wire 104 typically comprise copper (i.e., copper or a copper alloy). The messenger wire 102 is supported at different points along its length by support arms 108 which may be attached to support poles (not illustrated). The contact wire 104 may also be attached to the support poles by a steady arm 109 which reduces movement of the contact wire 104.

FIG. 1 illustrates a simple catenary system 100. Other types of catenary systems exist and the present disclosure is also applicable to other types of catenary systems for use with electrified trains. For example, some catenary systems may include non-conductive support wires that enable the messenger wire to support the contact wire, and separate conductive wires electrically connecting the messenger wire and the contact wire.

Figure 2:
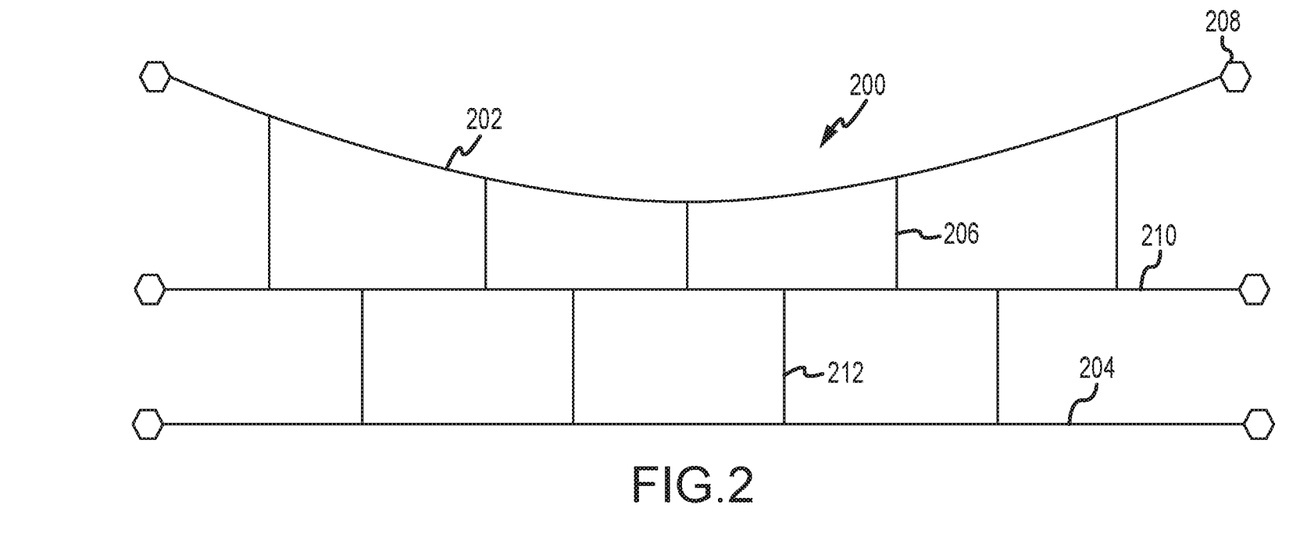
FIG. 2 schematically illustrates a side view of a compound catenary system for an electrified train.

By way of further example, FIG. 2 illustrates a schematic side view of a compound catenary system 200. In this compound catenary system 200 the messenger wire 202 directly supports an auxiliary messenger wire 210 through a plurality of droppers 206. The contact wire 204 is attached to the auxiliary messenger wire 210 through a plurality of auxiliary droppers 212. Thus, the messenger wire 202 directly supports the auxiliary messenger wire 210 and indirectly supports the contact wire 204 through the auxiliary messenger wire 210.

Figure 3:
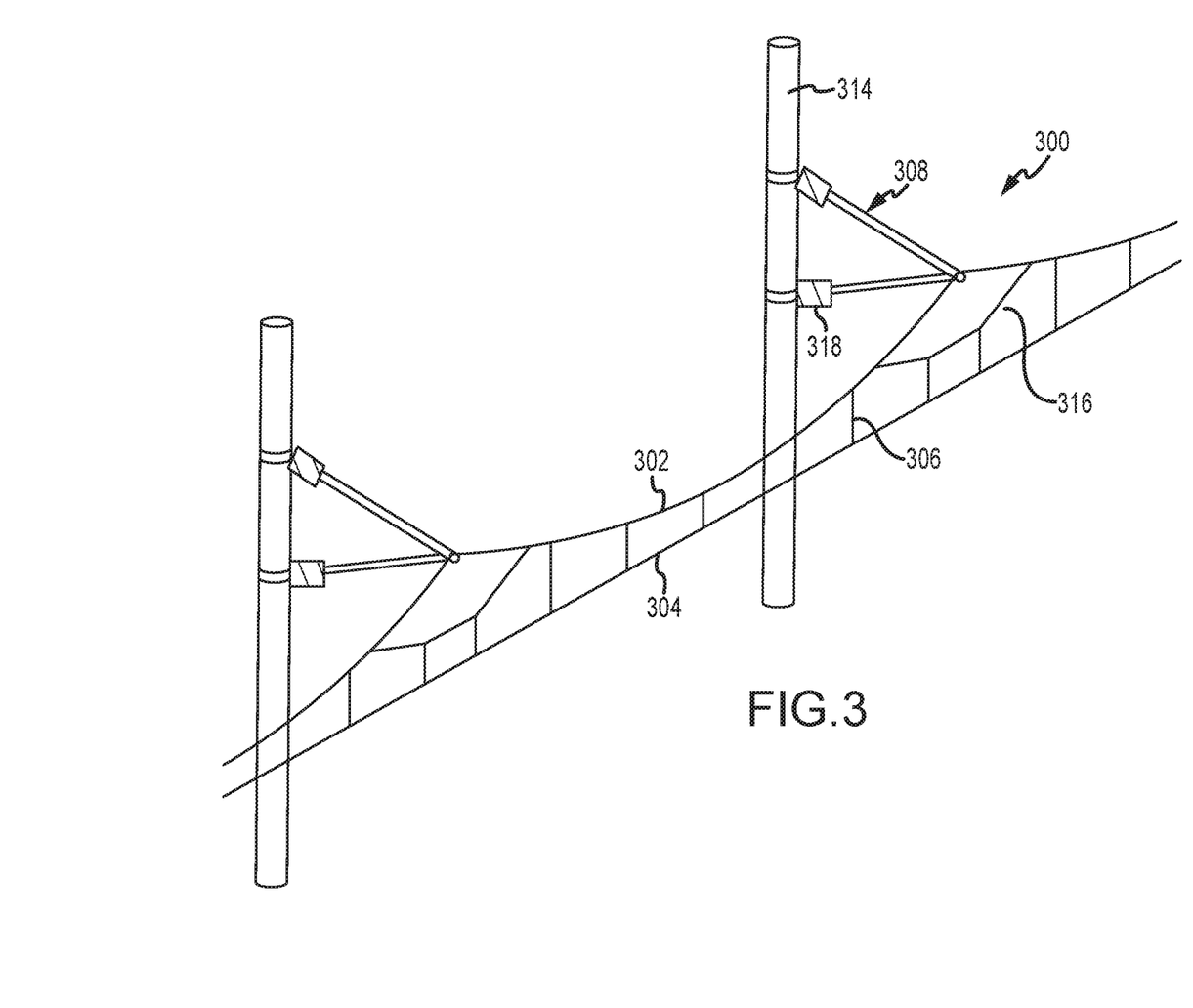
FIG. 3 illustrates a perspective view of a simple catenary system for an electrified train.

FIG. 3 illustrates a perspective view of a simple catenary system 300, such as that illustrated in FIG. 1. The simple catenary system 300 includes a plurality of support poles 314 that are spaced-apart along the length of the catenary system 300. The support poles 314 support the messenger wire 302 through a plurality of support arms structures 308. The support arms structures 308 may be electrically insulated from the support poles by insulators 318. The messenger wire 302 vertically supports the contact wire 304 along the length of the contact wire 304 through a plurality of droppers 306. Slight modifications of this structure along the length of the contact wire 304 may exist, such as the use of a stitch wire 316 to bypass the contact point where the messenger wire 302 is supported by the support arm structure 308.

In the catenary systems such as those illustrated in FIGS. 1-3, the contact wire provides electricity directly to the train traveling along the contact wire through a pantograph disposed on the top of the train. The pantograph maintains contact with the contact wire as the train moves. Electricity is provided to the contact wire by the messenger wire through the droppers. The messenger wire, the droppers and the contact wire must each be made of a highly conductive material. In these applications, the highly conductive material is copper, a copper alloy or copper clad steel. Most of the fixtures such as clamps to connect the messenger wire, dropper and contact wire are also made from a conductive material that is galvanically compatible with copper.

One disadvantage of such as system is that highly conductive copper and the copper-clad steel core strength member of the messenger wire also have a relatively high coefficient of thermal expansion (CTE). As a result, when the messenger wire increases in temperature due to resistance heating and/or ambient conditions (e.g., in the summer months), the length of the messenger wire increases between the affixed endpoints of the messenger wire. This results in the messenger wire sagging (i.e., relaxing and slumping towards the ground). When the messenger wire sags, the contact wire also drops closer to the ground.

Figure 4:
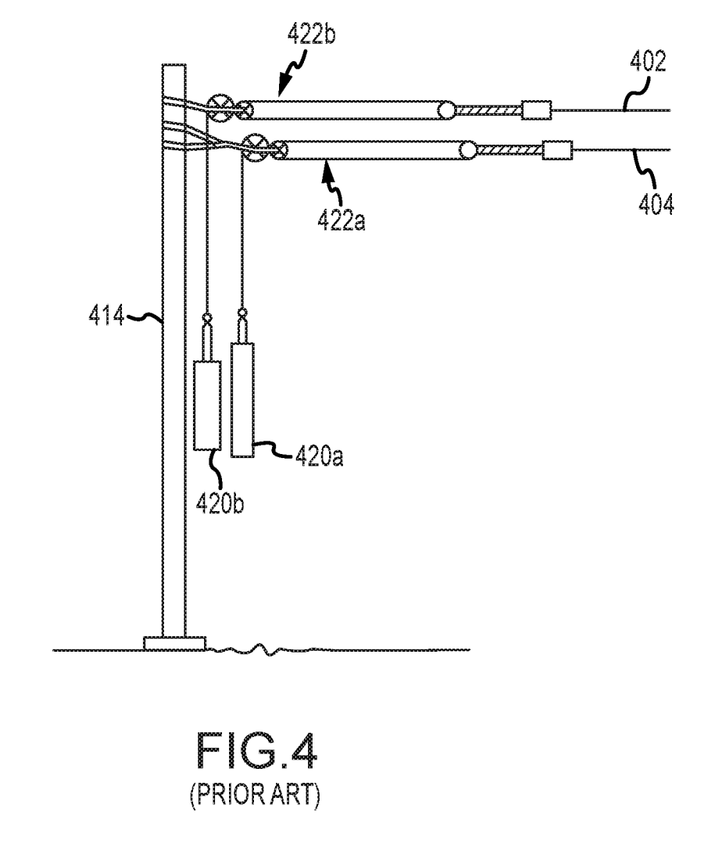
FIG. 4 illustrates a balanced weight constant tension system in a catenary system for an electrified train.

To address this issue, termination structures are currently utilized that attempt to apply a constant tension to the messenger wire and/or to the contact wire under such conditions. A common method to do so is through the use of hanging weights in a constant tension system, sometimes referred to as a balanced weight anchor. Such a system is schematically illustrated in FIG. 4. Referring to FIG. 4, a messenger wire 402 and a contact wire 404 terminate at a termination support pole 414. A first weight 420a is connected to the contact wire 404 through a pulley system 422a. Likewise, a second weight 420b is connected to the messenger wire 402 through a second pulley system 422b. These weights 422a/422b are carefully selected to constantly pull and counter the sag in the messenger wire 402 and the contact wire 404 through the pulley system 422a/422b and maintain the contact wire and messenger wire at constant tension as the wires heat up and cool down. However, such systems are costly to install and to maintain.

In one aspect of this disclosure, a messenger wire is disclosed that may obviate the need for such a constant tension system. Broadly characterized in accordance with the present disclosure, the messenger wire may include one or more of the following features: (i) a fiber-reinforced composite strength member that is engineered to have a high tensile modulus and a very low CTE; and/or (ii) a spacing or "gap" between the strength member and the surrounding conductive layer along the length of the strength member, the conductive layer comprising copper or a copper alloy. These features may be incorporated alone, or in combination. Thus, in one characterization the messenger wire comprise a fiber-reinforced composite strength member. In another characterization, the messenger wire comprises a gap between the strength member and the surrounding conductive copper layer. In another characterization, the messenger wire comprises a fiber-reinforced composite strength member and a gap between the strength member and the surrounding conductive layer comprising copper or a copper alloy.

In one particular characterization, the messenger wire comprises a fiber-reinforced composite strength member having a high tensile modulus and very low CTE and a gap between the strength member and the surrounding conductive layer.

Fiber-Reinforced Composite Strength Member

Figure 5:
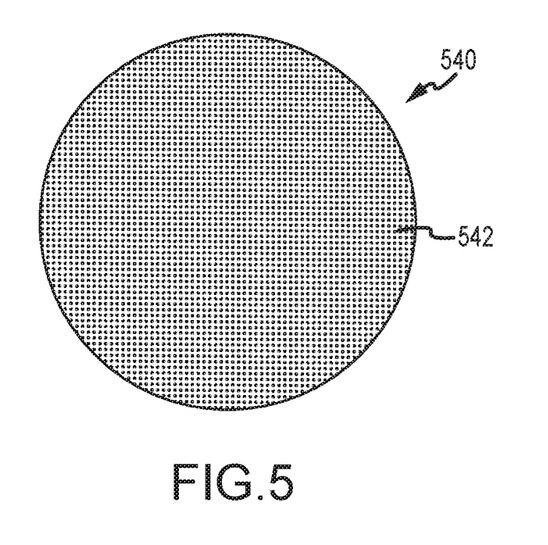
FIG. 5 illustrates a cross-section of a strength member for a messenger wire according to an embodiment of the present disclosure.

Accordingly, in one characterization, the messenger wire strength member is a fiber-reinforced composite strength member. A cross-sectional view of a fiber-reinforced composite strength member is illustrated in FIG. 5. The fiber-reinforced composite strength member 540 has a generally circular cross-section and is comprised of a composite material 542 of reinforcing fibers in a binding matrix.

The fiber-reinforced composite strength member 540 illustrated in FIG. 5 consists essentially of the composite material 542 comprising reinforcing fibers operatively disposed in (e.g., dispersed throughout) the binding matrix. The reinforcing fibers (i.e., filaments) may include substantially continuous filaments (e.g., fiber tows) and/or may include discontinuous fibers (e.g., fiber whiskers). The reinforcing fibers may be aligned within the binding matrix (e.g., an anisotropic composite) or may be randomly disposed within the binding matrix (e.g., an isotropic composite). In one characterization, the reinforcing fibers include substantially continuous fibers, such as in the form of one or more elongate fiber tows, disposed throughout a resin binding matrix. A fiber tow is a bundle of substantially continuous individual filaments, often comprising several thousand individual filaments in a single fiber tow.

In accordance with the present disclosure, at least a portion of the reinforcing fibers are high tensile modulus fibers. High tensile modulus fibers are defined herein as those having a tensile modulus of at least about 250 GPa. For example, the high tensile modulus reinforcing fibers may have a tensile modulus of at least about 250 GPa, for example at least about 275 GPa, at least about 290 GPa, at least about 300 GPa, at least about 310 GPa, and even at least about 330 GPa.

The high tensile modulus reinforcing fibers may include ceramic fibers, including oxide or non-oxide based ceramic fibers. Examples of non-oxide reinforcing ceramic fibers include, for example, carbide fibers such as silicon carbide fibers (SiC) or nitride fibers such as silicon nitride fibers ($Si_3N_4$). Examples of metal oxide fibers include zirconia-based fibers ($ZrO_2$), alumina fibers ($Al_2O_3$), aluminosilicate fibers and aluminoborosilicate fibers. Particular examples of high tensile modulus reinforcing ceramic fibers are those available from the 3M Company (St. Paul, Minn., USA) under the brand name NEXTEL, such as NEXTEL continuous filament ceramic oxide fibers 312, 440 and 550. Although described herein as ceramic fibers, it will be appreciated that such fibers may include both crystalline and glassy (e.g., amorphous) material phases.

In one particular characterization, the high tensile modulus reinforcing fibers comprise high tensile modulus carbon fibers. Non-limiting examples of high tensile modulus carbon fibers include carbon fibers sold under the trade names T800S, T800H, T1000 or T1000G (Toray Carbon, Carbon Fibers America, Inc., Santa Ana, Calif.). Other non-limiting examples include pitch-based carbon fibers such as Thornel P-55 pitch-based fibers (Cytec Engineering Materials, Tempe, Ariz.). PAN-based carbon fibers may also be useful. Pitch-based fibers may advantageously provide a lower tensile strain as compared to other carbon fibers, e.g., PAN-derived high tensile modulus carbon fibers.

In some characterizations, the reinforcing fibers may also have a relatively high tensile strength in addition to having a high tensile modulus, such that the fiber-reinforced composite strength member has a sufficiently high tensile strength to be safely utilized in a train messenger wire. In one characterization, the high tensile modulus fibers have a tensile strength of at least about 4.5 GPa, such as at least about 5 GPa, and even at least about 6 GPa or even at least 7 GPa.

In one characterization, the composite material 542 consists essentially of high tensile modulus reinforcing fibers. Although high tensile modulus fibers are desirable for reducing the sag characteristics of the fiber-reinforced composite strength member, such fibers are generally more expensive than lower tensile modulus fibers. Therefore, the reinforcing fibers in the composite material 542 may also include secondary reinforcing fibers that are different than the high tensile modulus fibers. For example, the secondary reinforcing fibers may advantageously be placed within the composite material 542 such that the tensile modulus of the reinforcing fibers decreases in a direction away from (i.e., radially away from) a central axis of the strength member 540. Alternatively, the secondary reinforcing fibers may be intimately mixed with the high tensile modulus fibers throughout the composite material 542.

For example, secondary reinforcing fibers may be selected from synthetic fibers or natural fibers. In another characterization, the secondary reinforcing fibers may be selected from organic fibers or inorganic fibers. For example, the secondary reinforcing fibers may include lower tensile modulus carbon fibers (e.g., graphite fibers or carbon nanofibers), aramid fibers such as KEVLAR™, glass fibers (including basalt fibers), lower tensile modulus ceramic fibers, boron fibers, liquid crystal fibers, high performance polyethylene fibers (e.g., SPECTRA fibers), steel fibers (e.g., steel hardwire filaments), including high carbon steel fibers, or fibers based on carbon nanotubes.

In one characterization, the secondary reinforcing fibers include carbon fibers such as those selected from high strength (HS) carbon fibers and intermediate modulus (IM) carbon fibers. The carbon fibers may be fabricated from precursors such as rayon, polyacrylonitrile (PAN) or petroleum pitch. Non-limiting examples of useful carbon fibers include those from the ZOLTEK PANEX™, ZOLTEK PYRON™, HEXCEL™, TORAY™, GRAFIL, or THORNEL™ families of carbon fiber products. Other examples of carbon fibers may include TORAY M46J, TORAY T700 SC-24K, TORAY T700SC-12K, GRAFIL TRH50-18M, PyroFil TR-50S or rayon byproducts, among others. Different types of glass fibers may also be useful as secondary reinforcing fibers in the fiber-reinforced composite strength members. Ceramic fibers may also be useful as secondary reinforcing fibers in the composite materials. Secondary reinforcing ceramic fibers may include, for example, carbide fibers such as silicon carbide fibers (SiC), nitride fibers such as silicon nitride fibers ($Si_3N_4$), metal oxide fibers such as zirconia-based fibers ($ZrO_2$), alumina fibers ($Al_2O_3$), aluminosilicate fibers and aluminoborosilicate fibers. Examples of reinforcing ceramic fibers are those available from the 3M Company (St. Paul, Minn., USA) under the brand name NEXTEL, such as NEXTEL continuous filament ceramic oxide fibers 312, 440 and 550. Although described herein as ceramic fibers, it will be appreciated that such fibers may include both crystalline and glassy (e.g., amorphous) material phases. Further, the secondary reinforcing fibers may be high tensile modules fibers (e.g., having a tensile modulus of greater than about 270 GPa), provided that the secondary reinforcing fibers have a tensile modulus that is less than the tensile modulus of the first reinforcing fibers.

Thus, in one characterization, the fiber-reinforced composite strength member may include at least two fiber types, i.e., first high tensile modulus reinforcing fibers and secondary reinforcing fibers that are different than the first high tensile modulus reinforcing fibers.

The selected reinforcing fibers should also have a relatively low CTE such that the strength member 540 has a relatively low CTE. For example, the CTE of the reinforcing fibers may be not greater than about $5 \times 10^{-6}/°$ C., or even not greater than about $2 \times 10^{-6}/°$ C., or even not greater than about $1 \times 10^{-6}/°$ C. In this regard, the reinforcing fibers may have a negative CTE. For example, carbon fibers are known to have a negative CTE, i.e., the length of carbon fibers decreases slightly with increasing temperatures over the range of temperatures that might be experienced by a fiber-reinforced composite strength member in a train messenger wire, e.g., from about −20° F. to about 200° F. (about −28.9° C. to about 93.3° C.). For example, the reinforcing carbon fiber may have a CTE of from about $-0.3 \times 10^{-6}/°$ C. to about $-1.1 \times 10^{-6}/°$ C. over this temperature range.

Thus, the composite material includes reinforcing fibers that extend substantially continuously through the length of the strength member. For example, the composite material may include one or more reinforcing fiber tows dispersed within a resin matrix. A fiber tow is a bundle of continuous filaments, where the number of individual filaments in the tow is expressed as its yield (yards per pound), or as its K number. For example, a 12K fiber tow includes about 12,000 individual filaments. By way of example, fiber-reinforced composite materials for strength members may be fabricated by selecting carbon fiber tows in the range of about 4K to about 60K, or greater.

Carbon filaments may be selected having a diameter of at least about 4 μm and not greater than about 10 μm, such as carbon filaments having a diameter of at least about 7 μm and not greater than about 8 μm. Ceramic filaments may have a diameter of at least about 7 μm and not greater than about 13 μm, for example. For other classes of reinforcing fibers, a suitable size range may be determined in accordance with the desired physical properties of the composite strength member, or based on the desired wet-out characteristics, or other manufacturing considerations discussed below. Notwithstanding the foregoing, the present disclosure is not limited to any particular filament diameter. For example, nanofilaments (e.g., carbon nanofilaments) may also be useful.

The volumetric ratio of reinforcing fiber to resin in the composite material 542 may be at least about 60:40, such as at least about 65:35 or even at least about 70:30. Although it is typically desirable to have this ratio be as high as possible, ratios above about 75:25 are not easily obtainable.

The composite material 542 may also include discontinuous fibers (e.g., whiskers) in combination with continuous reinforcing fibers. The discontinuous fibers may optionally be aligned within the binding matrix, or may be randomly oriented within the binding matrix. In one characterization, the discontinuous fibers include carbon nanofibers (e.g., discontinuous carbon nanofibers).

The reinforcing fibers are disposed within and bound together by a binding matrix. The binding matrix material is selected to be compatible with the fibers and with the intended application as a fiber-reinforced composite strength member for a messenger wire. The binding matrix in which the reinforcing fibers are embedded may include any type of inorganic or organic material that may operatively embed and bind the reinforcing fibers into a fiber-reinforced composite material 542. In one characterization, the binding matrix may predominately include an organic material, such as a polymer, e.g., a synthetic polymer. In one characterization, the binding matrix is a resin matrix, e.g., an epoxy resin matrix.

For example, the binding matrix may include a thermoplastic polymer, including semi-crystalline thermoplastics. Specific examples of useful thermoplastics include, but are not limited to, polyether ether ketone (PEEK), polypropylene (PP), polyphenylene sulfide (PPS), polyetherimide (PEI), liquid crystal polymer (LCP), polyoxymethylene (POM, or acetal), polyamide (PA, or nylon), polyethylene (PE), fluoropolymers and thermoplastic polyesters. Other examples of polymeric materials useful for a binding matrix may include addition cured phenolic resins, e.g., bismaleimides (BMI), polyetheramides, various anhydrides, or imides.

In one characterization, the binding matrix includes a thermosetting polymer. Examples of useful thermosetting polymers include, but are not limited to, benzoxazine, thermosetting polyimides (PI), polyether amide resin (PEAR), phenolic resins, epoxy-based vinyl ester resins, polycyanate resins and cyanate ester resins. In one exemplary embodiment, a vinyl ester resin is used in the binding matrix. Another embodiment includes the use of an epoxy resin, such as an epoxy resin that is a reaction product of epichlorohydrin and bisphenol A, bisphenol A diglycidyl ether (DGEBA).

Curing agents (e.g., hardeners) for epoxy resins may be selected according to the desired properties of the fiber-reinforced composite strength member and the processing method. For example, curing agents may be selected from aliphatic polyamines, polyamides and modified versions of these compounds. Anhydrides and isocyanates may also be used as curing agents.

The resin may also be selected to provide resistance to a broad spectrum of aggressive chemicals, and may be selected to have stable dielectric and insulating properties. It may be advantageous that the resin meets ASTME595 out-gassing standards and UL94 flammability standards, and is capable of operating at least intermittently at temperatures ranging between about 100° C. and 200° C. without substantial degradation (e.g., thermal or mechanical degradation) of the fiber-reinforced composite material. The resin may also be selected to maintain its integrity under extremely cold conditions, such as −50° C. or lower.

The resin may also include components to assist in fabrication and/or to improve the properties of the binding matrix. For example, a thermoset epoxy resin system for achieving the desired properties of the strength member, as well as ease of fabrication of the composite material, may incorporate a catalyst (e.g., an "accelerator") and/or an initiator that may be selected to facilitate curing of the epoxy resin components in a short time and/or with reduced side reactions that may cause cracking of the cured resin matrix. It may also be desirable for the catalyst to be relatively inactive at low temperatures for increased resin life (e.g., "pot life"), and very active at higher temperatures for increased manufacturing speed during fabrication of the composite material 542. The epoxy resins may also be further modified with additional processing aids (e.g., mold release agents and fillers) as well as performance-enhancing additives, e.g., for toughening or stiffening the matrix, e.g., with elastomers, thermoplastics and the like.

Throughout this disclosure, the term "epoxy resin" may be used to identify the binding matrix material of the fiber-reinforced composite material. However, the fiber-reinforced composite materials encompassed by this disclosure are not limited thereto and it is to be expressly understood that the fiber-reinforced composite materials described below may include other binding matrix materials in lieu of, or in addition to, epoxy resins.

Referring back to FIG. 5, fiber-reinforced composite strength member 540 consists essentially of the composite material 542 and has a generally circular cross-section. Although the strength member illustrated in FIG. 5 has a substantially circular cross-section, the present disclosure is not limited in this regard and it will be appreciated that other cross-sections (e.g., oval) may also be utilized. Through the careful selection of the reinforcing fibers and the epoxy resin matrix, the properties of the fiber-reinforced composite strength member 540 may be sufficient to form a messenger wire having a set of properties that contribute to the ability to remove the complex constant tension systems that are presently employed, such as that illustrated in FIG. 4. In one characterization, the fiber-reinforced composite strength member has a tensile modulus of at least about 110 GPa, such as at least about 120 GPa, or even at least about 130 GPa, such as at least about 140 GPa. The tensile modulus should generally be as high as possible, taking into account the cost and other factors such as the availability of high tensile modulus materials for the reinforcing fibers. As a practical matter, the tensile modulus of the fiber-reinforced composite strength member will generally not exceed about 200 GPa.

It is also desirable that the fiber-reinforced composite strength member is formed have a relatively low CTE. For example, the fiber-reinforced composite strength member may have an absolute CTE value of not greater than about $2 \times 10^{-6}/°$ C., such as not greater than about $1 \times 10^{-6}/°$ C., or even not greater than about $0.8 \times 10^{-6}/°$ C. A relatively low CTE will ensure that thermal expansion of the fiber-reinforced composite strength member (e.g., over a range of about $-50°$ C. to about $200°$ C.) will not significantly contribute to sagging of the messenger wire, and hence will not significantly contribute to sagging of the contact wire.

The fiber-reinforced composite strength member may also have a relatively high tensile strength to reduce the risk of the fiber-reinforced composite strength member breaking under a high tensile load. For example, the fiber-reinforced composite strength member may have a tensile strength of at least about 2100 MPa, such as at least about 2150 MPa, or even at least about 2200 MPa. The upper limit on the tensile strength is a function of the tensile strength of available reinforcing fibers, taking considerations such as cost. As a practical matter, the tensile strength of the fiber-reinforced composite strength member will typically not exceed about 2800 MPa, although higher tensile strengths may be achievable in the future.

In another characterization, the fiber-reinforced composite strength member will have a rated breaking strength that is relatively high. The rated breaking strength is a function of the tensile strength discussed above and the diameter of the fiber-reinforced composite strength member. For use as a strength member in a train messenger wire, the fiber-reinforced composite strength member 540 may have a diameter of at least about 5 mm, such as at least about 7 mm. Generally, the diameter will be not greater than about 14 mm, such as not greater than about 12.7 mm, such as not greater than about 11 mm, such as not greater than about 10.5 mm. The rated breaking strength of the fiber-reinforced composite strength member may be at least about 80 kN, such as at least about 120 kN or even at least about 150 kN. As with the tensile strength, the upper limit on the rated breaking strength is a function of the tensile strength of available reinforcing fibers, taking considerations such as cost into account. As a practical matter, the rated breaking strength of the fiber-reinforced composite strength member will typically not exceed about 230 kN.

In another characterization, the messenger wire includes an insulating layer disposed between the composite material and the outer conductive layer, e.g., an insulative layer surrounding the composite material. For example, the insulating layer may be a component of the fiber-reinforced composite strength member, such a one that is integrally formed with the composite material or is otherwise placed over the composite material during manufacture of the fiber-reinforced composite strength member. Additional material layers (e.g., conductive layers) may also be incorporated between the composite material and the outer conductive layer, provided that if an additional material layer is in direct contact with the outer (copper or copper alloy) conductive layer, the material should be compatible (e.g., galvanically compatible) with the copper.

Figure 6:
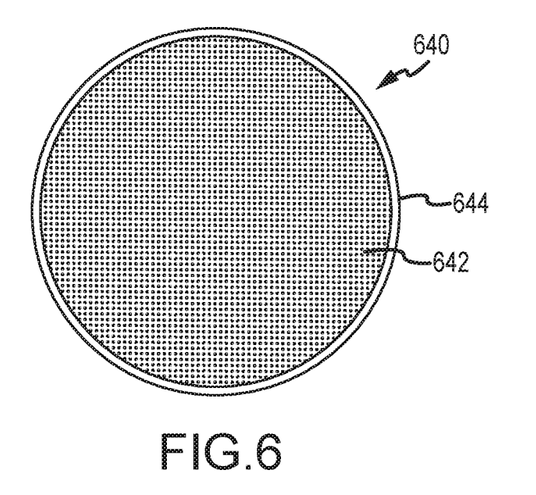
FIG. 6 illustrates a cross-section of strength member for a messenger wire according to an embodiment of the present disclosure.

FIG. 6 illustrates one example of such a fiber-reinforced composite strength member structure. The fiber-reinforced composite strength member 640 includes a fiber-reinforced composite material 642 such as that disclosed in detail above with respect to FIG. 5. An insulative layer 644 surrounds the fiber-reinforced composite material 642, e.g., is disposed around the outer circumference of the fiber-reinforced composite material 642.

In one characterization, the insulative layer 644 comprises a polymeric material, e.g., one that is applied to the composite material as a coating. In this regard, the electrically insulating material comprising the insulative layer 644 may be a polymeric material, such as a thermoplastic. In one characterization, the electrically insulating material is selected from the group consisting of polyimides, polytetrafluoroethylene (PTFE), fluorinated ethylene polymer (FEP), polyoxymethylene (POM) and polyetheretherketone (PEEK). In a particular characterization, the electrically insulating material comprises polyetheretherketone (PEEK).

In another characterization, the insulative layer 644 comprises electrically insulative fibers, such as glass insulating fibers. For example, the glass insulating fibers may be selected from A-Glass, B-Glass, C-Glass, D-Glass, E-Glass, H-Glass, S-Glass, AR-Glass, R-Glass, or basalt (e.g., volcanic glass) fibers. Fiberglass and paraglass may also be used. For example, S-2 Glass 758-AB-225, S-2 Glass 758-AB-675; E-Glass 366-AC-250; E-Glass 366-AB-450, E-Glass 366-AB-675, and basalt containing E-Glass may all be useful for the insulating fibers. In one example, a boron-free glass such as E-Glass is used as a glass insulating fiber. In another characterization, the glass fibers insulating may be selected from H-glass fibers, S-glass fibers and basalt fibers.

In another characterization, the insulative layer may include other types of insulating fibers, such as polymeric insulating fibers. For example, the polymeric insulating fibers may include aramid fibers. When substantially continuous fibers (e.g., glass insulating fibers or polymeric insulating fibers) are utilized in the insulative layer 644, the fibers may be disposed in a binding matrix such as a resin matrix. In one characterization, the insulative layer 644 comprises substantially continuous insulative fibers in a resin matrix that is integrally formed with the composite material 642, e.g., where the insulating fibers and the reinforcing fibers are disposed within the same binding matrix. In one alternative, the insulating fibers may be disposed in a binding matrix that is different than the binding matrix used in the composite material 642.

In yet another characterization, the insulative layer 644 is formed of the epoxy resin that is used as the binding matrix in the composite material 642. That is, the composite material 642 is surrounded by an insulative layer 644 that includes the binding matrix, but does not include the reinforcing fibers that are found in the composite material 642. Stated another way, a shell of insulative epoxy resin is integrally formed with and surrounds the composite material 642 which is composed of reinforcing fibers and the epoxy resin.

In any event, the insulative layer 644 should have a sufficient thickness to adequately insulate the composite material 642, e.g., electrically insulate the composite material 642 from the electrically conductive layer that is disposed around the fiber-reinforced composite strength member 640. In one characterization, the insulative layer 644 has a thickness of at least about 100 μm (e.g., when the insulative layer comprises a polymeric coating or the binding matrix), and in another characterization has a thickness of at least about 0.5 mm (e.g., when the insulative layer comprises insulating fibers that are integrally formed with the functionally-gradient fiber-reinforced composite material). Generally, the thickness of the insulative layer 644 will not exceed about 1 mm.

In one particular characterization of the fiber-reinforced composite strength member 640, the composite material 642 comprises substantially continuous high tensile modulus carbon fibers (e.g., carbon fiber tows) in an epoxy resin matrix and the insulative layer 644 comprises substantially continuous electrically insulative glass fibers in the same epoxy resin matrix, i.e., where the composite material 642 and the insulative layer 644 are integrally formed.

Gap Structure

Figure 7:
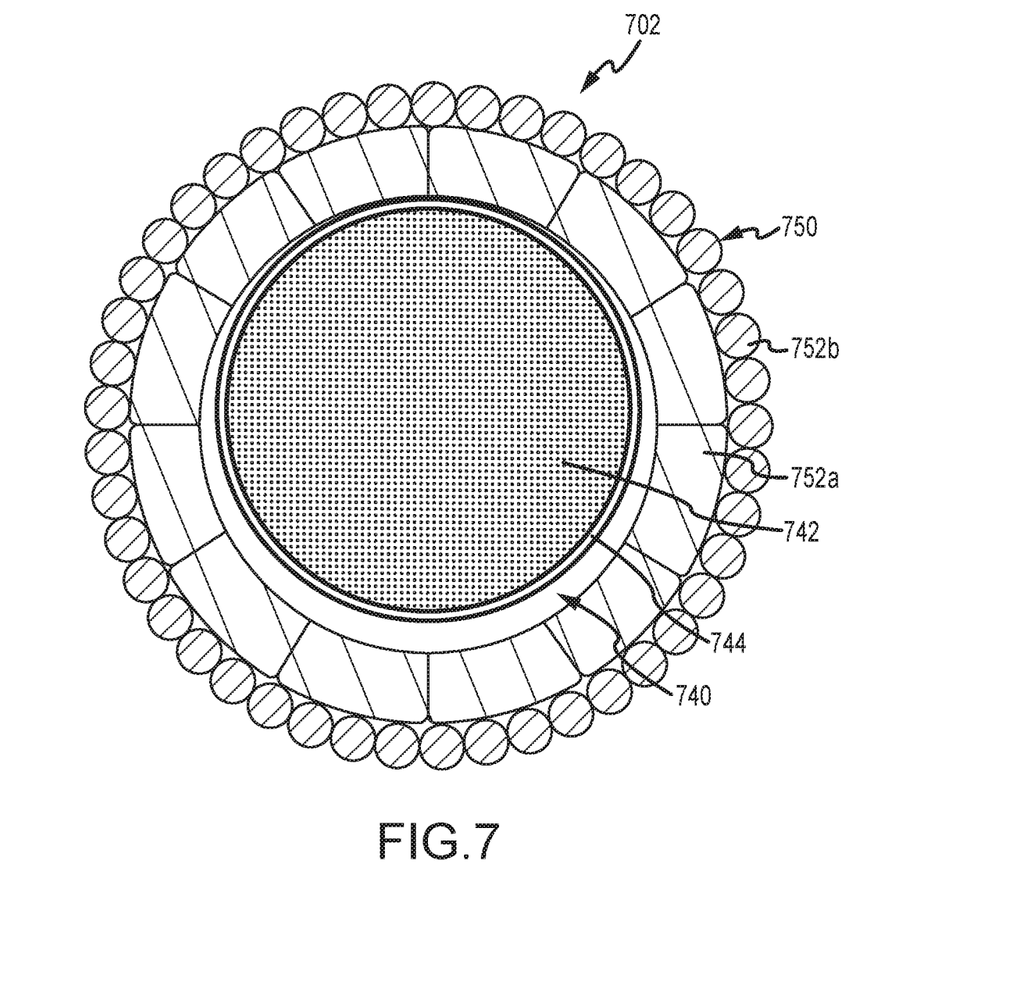
FIG. 7 illustrates a cross-section of a messenger wire according to one embodiment of the present disclosure.

The messenger wire disclosed herein may also include a "gapped" structure, where a small gap exists between the strength member and the conductive layer, i.e., between an outer surface of the strength member and an inner surface of the conductive layer. Referring to FIG. 7, a messenger wire 702 includes a strength member 740 and a conductive layer 750 that is supported by the strength member 740. As illustrated in FIG. 7 the strength member 740 includes a composite material 742 surrounded by an insulative layer 744, similar to the structure illustrated in FIG. 6. The messenger wire 702 is formed with a gap 760 between the conductive layer 750 and the strength member 740. Although illustrated as being disposed beneath the strength member 740, it will be appreciated that depending on the orientation of the messenger wire 702, the gap 760 may be evenly distributed around the entire circumference of the strength member 740. The gap 760 may be empty (e.g., comprising air). In one characterization, the gap 760 between the strength member 740 and the conductive layer 750 is filled with a material to reduce friction between the strength member 740 and the conductive layer 750, such as a thermally stable grease.

The presence of the gap 760 between the strength member 740 and the conductive layer 750 enables the strength member and the conductive layer to move independently from one another. In this way, substantially all of the tension can be placed on the strength member 740 (e.g., during installation of the messenger wire 702) without placing any substantial tension on the conductive layer 750. When used in combination with a fiber-reinforced composite strength member having a very low coefficient of thermal expansion, such as strength member 740, the very low coefficient of thermal expansion of the strength member 740 will dictate the sag as a function of the temperature of the messenger wire 702. This will allow for a nearly constant tension on the messenger wire 702 at any temperature, stabilizing its sag and improving the contact of the contact wire with the pantograph. The size of the gap may be, for example, at least about 0.1 mm around the entire circumference of the strength member, for example at least about 0.2 mm around the entire circumference of the strength member, or even at least about 0.5 mm around the entire circumference of the strength member. Stated another way, the radius of the inner surface of the conductive layer 750 may be at least about 0.1 mm greater than the outer radius of the strength member 740, including the insulative layer 744, for example at least about 0.2 mm, or even at least about 0.5 mm greater than the outer radius of the strength member 740, including the insulative layer 744.

As illustrated in FIG. 7, the messenger wire 702 includes a conductive layer 750 that comprises a plurality of individual conductive strands 752a and 752b. The conductive strands 752a are trapezoidal in shape. The trapezoidal shaped conductor strands 752a are surrounded by smaller circular conductor strands 752b. Thus, the trapezoidal strands 752a may be helically wrapped around the strength member 740, and the smaller round conductor strands 752b may be helically wrapped around the trapezoidal strands 752a. The conductor strands 752a/752b are fabricated from highly conductive copper or copper alloys.

Figure 8:
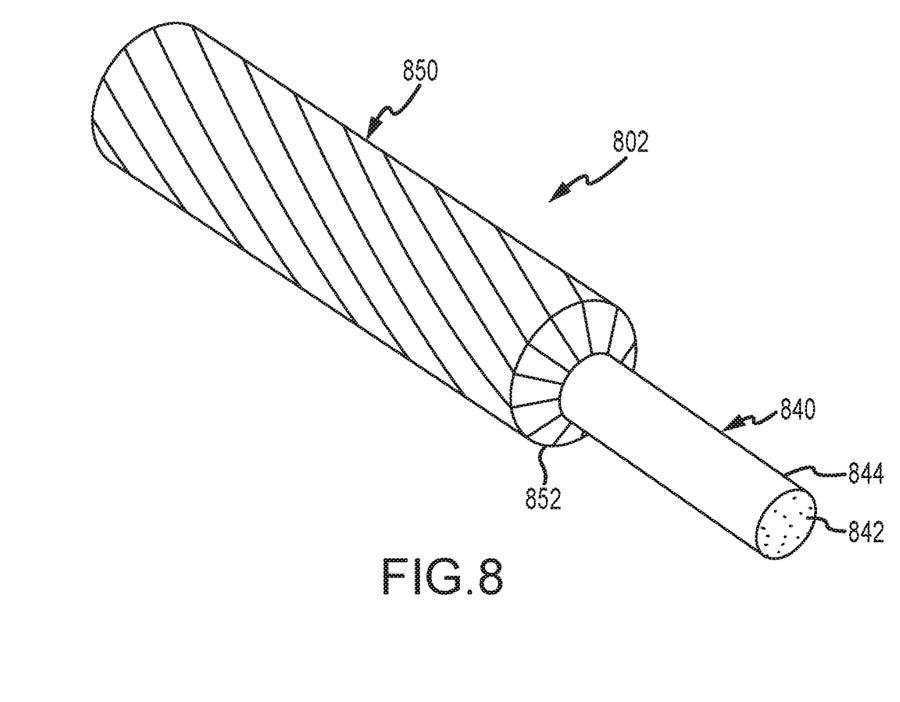
FIG. 8 illustrates a sectional perspective view of a messenger wire according to one embodiment of the present disclosure.

FIG. 8 illustrates a cutaway perspective view of a messenger wire 802 in accordance with one embodiment of the present disclosure. The messenger wire 802 includes a single fiber-reinforced composite strength member 840 that includes a fiber-reinforced composite material 842. It is notable that the messenger wires disclosed herein may include a single, unitary strength member, i.e., as compared to known messenger wires wherein the strength member is formed from a plurality of helically wrapped individual strands of copper clad steel. An insulative layer 844 (e.g., a glass fiber layer) is disposed between the composite material 842 and the conductive layer 850. The conductive layer 850 includes a plurality of individual electrical conductor strands 852 that are trapezoidal in shape, e.g., as described with reference to FIG. 7. Although not illustrated in FIG. 8, the messenger wire 802 may also have a gap form between the conductive layer 850 and the strength member 840. Further, the conductive layer 850 may also comprise circular conductor strands helically wrapped around the trapezoidal strands as illustrated in FIG. 7. Alternatively, the electrical conductor strands may have a cross-section that is in the general shape of a "Z", e.g., where the electrical conductor strands interlock with adjacent conductor strands.

In any event, the conductor strands 852 are fabricated from copper or a copper alloy that is predominately composed of copper. Copper is typically desirable due to its very high conductivity.

Methods for the Manufacture of Fiber-Reinforced Composite Strength Members

Figure 9:
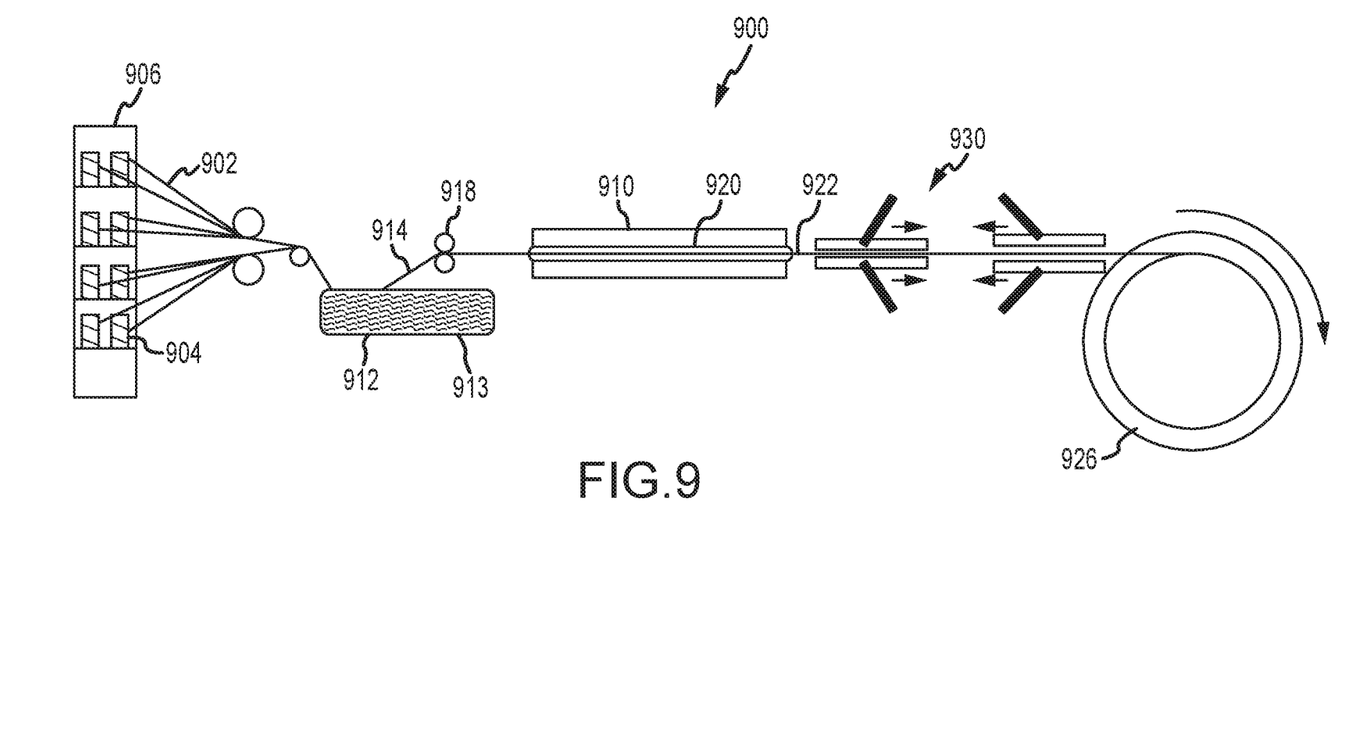
FIG. 9 illustrates a schematic of a method for the production of a fiber-reinforced composite strength member according to an embodiment of the present disclosure.

According to one characterization, the fiber-reinforced composite strength members may be fabricated by a pultrusion process. By way of example, FIG. 9 is a schematic illustration of a pultrusion apparatus 900 that may be useful in a method for the manufacture of a fiber-reinforced composite material for the strength member. The reinforcing fibers are typically provided as fiber tows that are disposed on spools, center pull packages or similar devices (collectively referred to herein as "spools"), to facilitate continuous pulling of the reinforcing fibers. The fiber spools 904 may include continuous lengths of fiber tows 902 that are several kilometers or more in length, such as 8 kilometers, 10 kilometers or in excess of 12 kilometers in length, thereby enabling production of fiber-reinforced composite strength members of similar lengths. Referring to FIG. 9, the reinforcing fiber tows 902 can be pulled from a plurality of fiber spools 904. In this regard, multiple spools of fiber tows can be contained on a rack 906 to simultaneously provide multiple tows of the reinforcing fibers to the unit operations. In one example, the rack 906 may hold multiple spools 904 of reinforcing fiber tows 902 that are simultaneously advanced through the subsequent forming operations.

After being pulled from their spools 904, the reinforcing fiber tows 902 may be guided to spatially arrange the reinforcing fiber tows 902 in a desired manner. For example, fibers of a first type (e.g., high tensile modulus fibers) may be guided such that the first type fibers are disposed proximate a central axis of the resulting fiber-reinforced composite material and fibers of a second type (e.g., secondary fibers) may be guided such that the second type fibers are placed in an outer material section surrounding the inner material section.

The fiber spools 904 may be configured such that the fiber tows 902 undergo non-tangential pulling (e.g., from a center-pull package). Advantageously, the fiber tows 902 may undergo tangential pulling from the fiber spools 904 to prevent or reduce the potential of twisting of the reinforcing fibers, which can be detrimental to the physical properties of the strength member. For example, twisted fibers can create dry spots in the composite member as a result of incomplete wetting of the reinforcing fibers during the subsequent resin wet-out steps, resulting in a weak spot in the strength member.

The reinforcing fiber tows 902 are advanced through the forming operations by being pulled. For example, the fiber-reinforced composite material 922 exiting a curing die 910 may be pulled to advance the reinforcing fibers. Thus, the reinforcing fiber tows 902 may be substantially continuously pulled from the fiber spools 904, such as by an electrical motor or any other appropriate drive, or by a reciprocation system 930 as illustrated in FIG. 9. In one characterization, the tension on each fiber spool 904 may also be independently controlled. For example, the dispensing rack 906 may include a device (e.g., a brake mechanism) allowing for the adjustment of tension for each fiber spool 904. Tension adjustment can be used to reduce the formation of catenaries (knots) and reduce cross-over of the fiber tows 902 as they advance through the forming operations. Tension adjustment of the reinforcing fiber tows 902 can also aid in the resin wetting process.

The reinforcing fibers are subjected to a wet-out step, whereby the fiber tows are contacted with a resin (e.g., a liquid epoxy resin) to coat and impregnate the reinforcing fibers with the resin to form a resin-impregnated fiber bundle. Various alternative techniques known in the art can be employed to apply and impregnate the fibers with resin. Such techniques may include for example, spraying, dipping, reverse coating, roll coating, brushing and resin injection. Dry resins can also be utilized, such as dry thermoplastic resins.

As illustrated in FIG. 9, the fiber tows 902 are contacted with a liquid resin 913 in a resin bath 912 by pulling the reinforcing fiber tows 902 through the resin bath 912 to form a resin-impregnated fiber bundle 914. The viscosity of the resin 913 during wet-out can affect the fabrication rate, i.e., the speed at which the fiber tows 902 can be pulled through the unit operations. To achieve the desired proportion of fiber-to-resin for formation of a fiber-reinforced composite material for a strength member, the viscosity of the resin 913 during wet-out may be, for example, at least about 200 cPs and not greater than about 10,000 cPs at the wet-out temperature (e.g., about 20° C.). After wet-out of the fiber tows, the resin-impregnated fiber bundle 914 may be subjected to a wiping step to remove a portion of the resin from the fibers. The wiping step may be adapted to remove a portion of the resin so that the desired fiber to resin ratio can be achieved in the fiber-reinforced composite material. For example, the resin-impregnated fiber bundle 914 may be pulled over or under a plurality of wiping bars 918 to remove excess resin. The excess resin removed from the fiber bundle 914 may be recycled back to the resin bath 912 to conserve resin.

The resin-impregnated fiber bundle 914 may then be subjected to a curing step to substantially cure the resin to form the fiber-reinforced composite material 922. For example, the curing step may include passing the resin-impregnated fiber bundle 914 through one or more temperature-controlled heating zones in a curing die 910 having a curing die bore 920. Generally, the temperature of the heating zone(s) is at least about 100° C. and is not greater than about 800° C. In one example, the temperature of the controlled heating zones gradually increases as the resin-impregnated fiber bundle 914 moves through the curing die 910. The length of the curing die 910 and the speed of the fiber bundle 914 through the curing die 910 determine the amount of time that the resin will be subjected to the curing temperature. Other curing methods may be employed, such as ultraviolet (UV) curing, electron beam curing and x-ray curing.

The fiber-reinforced composite material 922 exiting the curing die 910 may be subjected to a post-curing step and a cool-down step. The post-curing step may include, for example, maintaining an elevated temperature for a period of time, such as a temperature of about 200° C. Cool-down of the fiber-reinforced composite material 922 may be achieved by exposing the composite material 922 to substantially ambient conditions for a period of time sufficient to cool the composite material 922 so that it can be wound or otherwise disposed onto a storage spool 926 or similar structure for storage and/or transport.

Thus, the fiber-reinforced composite material 922 may be wrapped around a storage spool 926 (e.g., a transport drum) at the end of the pultrusion process for storage and/or transport of the composite material 922. In one configuration, the storage spool 926 may have a size (e.g., an internal diameter) that is sufficient to hold at least about 500 meters of strength member 922, such as at least about 1 km, at least about 2 km, at least about 5 km, and even at least about 7.5 km. For example, the storage spool 926 may be a wooden storage spool and may have an internal diameter around which the composite member is wrapped of at least about 0.3 meter, such as at least about 0.5 meter, or even at least about 1 meter.

An insulative layer (e.g., a coating) may be applied around the fiber-reinforced composite material. Such a material layer may be applied prior to wrapping the fiber-reinforced composite material on a storage spool (e.g., the placement of the material layer may be integrated with the pultrusion process), or the material layer may be disposed on the fiber-reinforced composite material at a later time, e.g., after initial placement of the fiber-reinforced composite on the storage spool. In this regard, the fiber-reinforced composite material may be unwrapped from the spool, coated with a material layer (e.g., a polymer such as PEEK), and then re-wrapped on another storage spool for subsequent storage and transportation of the completed strength member. When the strength member includes an insulative layer comprising substantially continuous glass fibers, the glass fibers may be integrated directly into the pultrusion process described above such that the glass fibers are disposed in a resin that is cured with the resin binding the (high tensile modulus) reinforcing fibers.

Installation of Messenger Wires

Using the messenger wire configuration(s) described herein, it may be possible to install the messenger wire in a catenary system such that the relevant properties of the messenger wire are dictated entirely by the strength member. For the messenger wire to exhibit only the properties of the strength member, the conductive layer will not carry any tensile load. The ambient temperature range over which the messenger wire must not change tension is from about −30° C. to about 100° C. Thus, the thermal knee point of the messenger wire, which is the temperature at which all the load is relieved from the conductive copper strands, needs to be down to the lowest temperature possible to ensure nearly constant tension over the desired operating ambient temperature range for the electric trains. Therefore, the messenger wire much be installed in such a way that the thermal knee point is lowered down to the desired lowest ambient temperature. This ensures that at very low temperatures (below freezing), the wire will not "hog" up, which can also change the elevation of the contact wire above the train tracks, which may also influence the safely obtainable speed of the trains.

The foregoing embodiments of an electrical train messenger wire may enable the messenger wire to be installed using unique methods. For example, the messenger wires may be installed in a catenary system in a manner such that substantially all of the tension on the messenger wire applied to the strength member, and substantially no tension is applied, directly or indirectly, to the conductive layer. The messenger wire may also be installed without the use of balance weights, such as those illustrated in FIG. 4, or similar systems that were previously required to maintain constant tension on the messenger wire, which may reduce capital costs and operating (e.g., maintenance) costs.

In one embodiment, the messenger wire may be installed (strung) without the use of a cantilever system.

While various embodiments of a messenger wire, methods for making a messenger wire and methods for installing a messenger wire for electric trains have been described in detail, it is apparent that modifications and adaptations of those embodiments will occur to those skilled in the art. However, it is to be expressly understood that such modifications and adaptations are within the spirit and scope of the present disclosure.

What is claimed is:

1. An electrical train messenger wire, the messenger wire comprising:
   a single unitary fiber-reinforced composite strength member, the single unitary fiber-reinforced strength member having a tensile strength of at least about 2100 MPa and a coefficient of thermal expansion (CTE) that is not greater than about $2\times10^{-6}/°$ C.;
   a conductive layer surrounding the single unitary fiber-reinforced composite strength member, the conductive layer comprising copper or a copper alloy; and
   an insulative layer is disposed between the single unitary fiber-reinforced composite strength member and the conductive layer,
   wherein the messenger wire comprises a gap between an outer radius of the single unitary composite strength member and an inner radius of the conductive layer.

2. The electrical train messenger wire recited in claim 1, wherein the gap between the single unitary composite strength member and the conductive layer has a size of at least about 0.5 mm between an entire circumference of the single unitary composite strength member and the conductive layer.

3. The electrical train messenger wire recited in claim 1, wherein the conductive layer comprises a plurality of helically-wound and interlocking conductor strands.

4. The electrical train messenger wire recited in claim 1, wherein conductive layer comprises a plurality of copper conductor strands.

5. The electrical train messenger wire recited in claim 1, wherein the single unitary fiber-reinforced composite strength member comprises substantially continuous high tensile modulus reinforcing fibers.

6. The electrical train messenger wire recited in claim 5, wherein the high tensile modulus reinforcing fibers have a tensile modulus of at least about 275 GPa.

7. The electrical train messenger wire recited in claim 6, wherein the high tensile modulus reinforcing fibers have a tensile modulus of at least about 300 GPa.

8. The electrical train messenger wire recited in claim 1, wherein the high tensile modulus reinforcing fibers have a tensile strength of at least about 4.5 GPa.

9. The electrical train messenger wire recited in claim 8, wherein the high tensile modulus reinforcing fibers comprise carbon fibers.

10. The electrical train messenger wire recited in claim 1, wherein the single unitary fiber-reinforced strength member comprises secondary reinforcing fibers that are different than the high tensile modulus reinforcing fibers.

11. The electrical train messenger wire recited in claim 10, wherein the high tensile modulus reinforcing fibers are disposed in a polymer matrix.

12. The electrical train messenger wire recited in claim 11, wherein the high tensile modulus reinforcing fibers are disposed in a thermoplastic polymer matrix.

13. The electrical train messenger wire recited in claim 11, wherein the high tensile modulus reinforcing fibers are disposed in an epoxy resin matrix.

14. The electrical train messenger wire recited in claim 11, wherein the high tensile modulus reinforcing fibers are disposed in a thermosetting polymer matrix.

15. The electrical train messenger wire recited in claim 14, wherein the single unitary fiber reinforced strength member comprises secondary reinforcing fibers that are different than the high tensile modulus reinforcing fibers.

16. The electrical train messenger wire recited in claim 1, wherein the insulative layer comprises a glass layer.

17. The electrical train messenger wire recited in claim 16, wherein the glass layer comprises substantially continuous glass fibers that are integrally formed with the single unitary fiber-reinforced strength member.

18. The electrical train messenger wire recited in claim 17, wherein the insulative layer has a thickness of at least about 0.5 mm.

19. The electrical train messenger wire recited in claim 1, wherein the insulative layer comprises a polymeric coating on the strength member.

20. The electrical train messenger wire recited in claim 19, wherein the insulative layer has a thickness of at least about 100 μm.

21. The electrical train messenger wire recited in claim 1, wherein the single unitary fiber-reinforced composite strength member has a tensile modulus of at least about 110 GPa.

22. The electrical train messenger wire recited in claim 1, wherein the single unitary fiber reinforced strength member has a diameter of at least about 5 mm and not greater than about 14 mm.

23. The electrical train messenger wire recited in claim 22, wherein the conductor strands have a Z-shaped cross-section.

24. A catenary system for an electrified train, comprising:
   a plurality of spaced-apart support structures;
   a messenger wire operatively attached to the plurality of support structures; and an electrically conductive contact wire operatively disposed below the messenger wire and being supported by the messenger wire, wherein the messenger wire is a messenger wire comprises;

a single unitary fiber-reinforced composite strength member, the single unitary fiber-reinforced strength member having a tensile strength of at least about 2100 MPa and a coefficient of thermal expansion (CTE) that is not greater than about $2\times10-6/°$ C.;

a conductive layer surrounding the single unitary fiber-reinforced composite strength member, the conductive layer comprising copper or a copper alloy; and a gap between an outer radius of the single unitary composite strength member and an inner radius of the conductive layer, and wherein substantially all of the tension in the messenger wire is placed on the strength member.

25. The catenary system recited in claim 24, wherein the contact wire is attached to the messenger wire by a plurality of droppers.

26. The catenary system recited in claim 24, wherein the contact wire is attached to an auxiliary messenger wire and the auxiliary messenger wire is attached to the messenger wire.

27. The catenary system recited in claim 26, wherein the messenger wire is attached to the support structures by a plurality of support arms.

28. The catenary system recited in claim 27, wherein the catenary system does not include a balanced weight anchor.

29. The electrical train messenger wire recited in claim 1, wherein the radius of the inner surface of the conductive layer is greater than the outer radius of the single unitary composite strength member.

30. The electrical train messenger wire recited in claim 1, wherein the gap may be evenly distributed around an entire circumference of the single unitary composite strength member.

31. The electrical train messenger wire recited in claim 1, wherein the gap enables the strength member and the conductive layer to move independently from one another.

* * * * *